United States Patent Office 3,047,102
Patented July 31, 1962

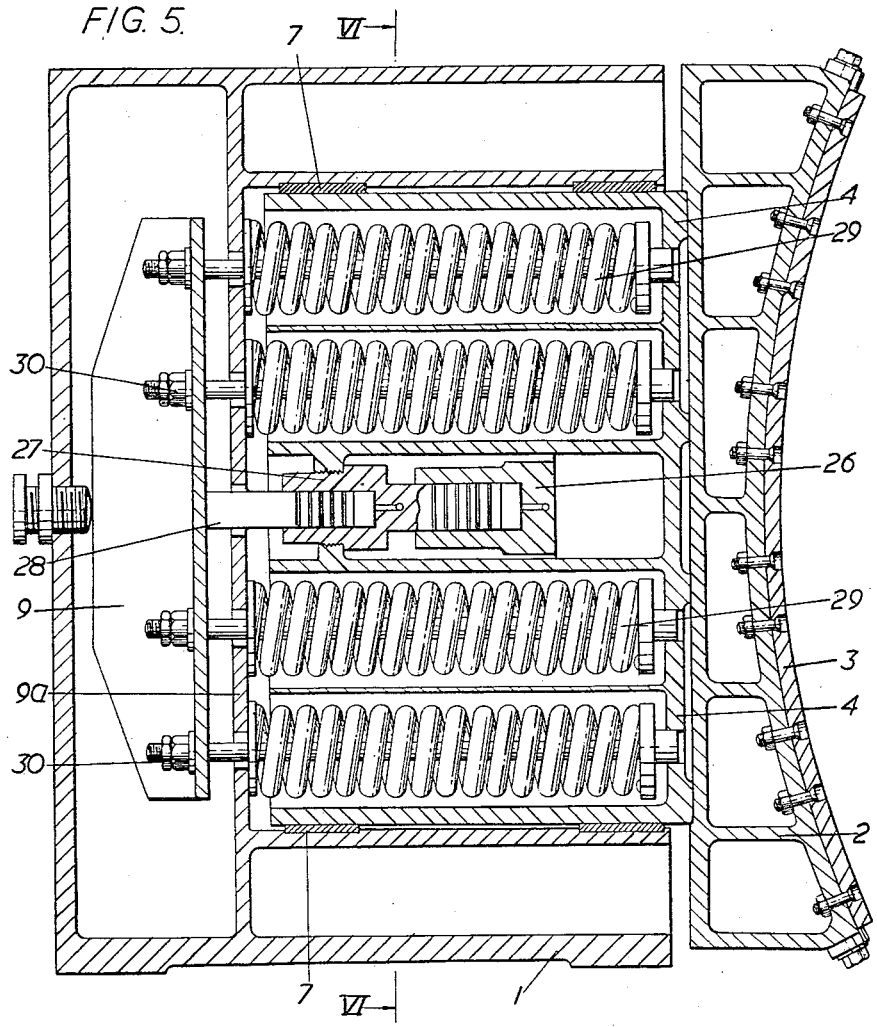

3,047,102
MECHANICAL BRAKE SYSTEM FOR WINDING ENGINES, CONVEYORS AND OTHER ROTATING MACHINES
Arthur Crompton, Lincoln, England, assignor of one-half to Robey & Co., Limited, Lincoln, England, a British company
Filed Apr. 9, 1958, Ser. No. 727,368
Claims priority, application Great Britain Oct. 23, 1957
1 Claim. (Cl. 188—170)

This invention relates to mechanical brakes and the means of operating the same for use with drum winders, conveyors, single and multi-rope winders and other rotating machines.

Known types of brakes used for the above purpose are pivotally mounted and have an arc of contact varying from 60° to 90° or even more. They do not exceed four in number and as they must be capable of exerting the maximum braking torque that may be required they are inevitably heavy, and their great inertia makes it difficult to design such a brake to give the fine control, sensitive response and accurate governing that is called for.

Various means have been adopted towards satisfying these requirements so far as the operating mechanism of the brakes is concerned, among which are the means disclosed in United States Letters Patents Nos. 2,490,941 and 2,554,235. The brakes themselves, however, have always remained comparatively heavy units.

Moreover, it is necessary to provide sufficient working clearance along the whole of the comparatively great arc of contact of the brake shoe. Since the brake is pivotally mounted, and moves rotatably, the amount of the clearance is undesirably large for the smooth and rapid application of the brakes.

Further, in known systems all the brakes are operated whatever may be the braking requirements at the time of operation. Most braking operations only require the application of a part of the maximum braking effort available but the whole number of the brakes is operated and the total inertia of the braking system has to be overcome. Since in known systems the same brakes are used for both normal operation and for the various conditions of emergency operation the failure of all or one of the brakes results in a total or partial loss of the braking torque required for safe operation.

The present invention has for its main object the overcoming of these difficulties and accordingly consists in a braking system for winding engines, conveyors and other rotating machines, having two or more arcuate brake shoes, the shoes when in pairs being diametrically opposed to each other on opposite sides of the brake drum or alternatively the brake shoes are disposed in any convenient arrangement around the brake drum, so that the movement of the shoes, however disposed, is in a radial direction with respect to the brake paths of the rotating element, each shoe being guided for linear movement and means for simultaneously urging the brake shoes into contact with the brake drum.

According to a further feature of the invention each brake shoe has an arc of contact with the winding drum less than 60°. In this way the progressive reduction in pressure from the centre of application to the extremity of the brake shoe is reduced to a minimum and wear at the brake surface is rendered as uniform as possible. Moreover by use of brakes of small arc contact and moving linearly in the manner described it is possible to reduce the clearance to a minimum and to dispose four brakes operated as two pairs upon the same peripheral portion of the winding drum with consequent economy of space. The brake shoes of relatively small arc of contact and the moving parts associated therewith may be small, light construction having relatively low inertia compared with previously known mechanisms.

When the brakes are used in association with multi-rope friction winders, advantage is taken of arranging the brakes substantially as above but at intervals between the ropes, thus keeping the length of the friction drum to a minimum. The brakes may alternatively be arranged outside the ropes.

Each brake may be so constructed that the inner portion carrying the friction material is rapidly removable, both to facilitate renewals and to enable certain of them to be removed, as required, during the replacement of the ropes of multi-rope friction winders.

The operating medium of the brakes may have common connection for simultaneous operation or separate connections for simultaneous operation or separate connections for operation in selected groups or units. The operating medium may be of any known type but advantage may be taken of utilising extra high hydraulic pressure to compress springs which in turn operate the brakes.

The invention will be further described with reference to the accompanying drawings in which FIGURE 1 is a side elevation of one form of brake unit according to the invention, sectioned along the line II—II of FIGURE 2;

FIGURE 4 is the end elevation of the brake unit shown in FIGURE 3, sectioned along the line IV—IV of FIGURE 3;

FIGURE 5 is the side elevation of a third form of brake unit according to the invention, sectioned along the line V—V of FIGURE 6;

Figure 1:
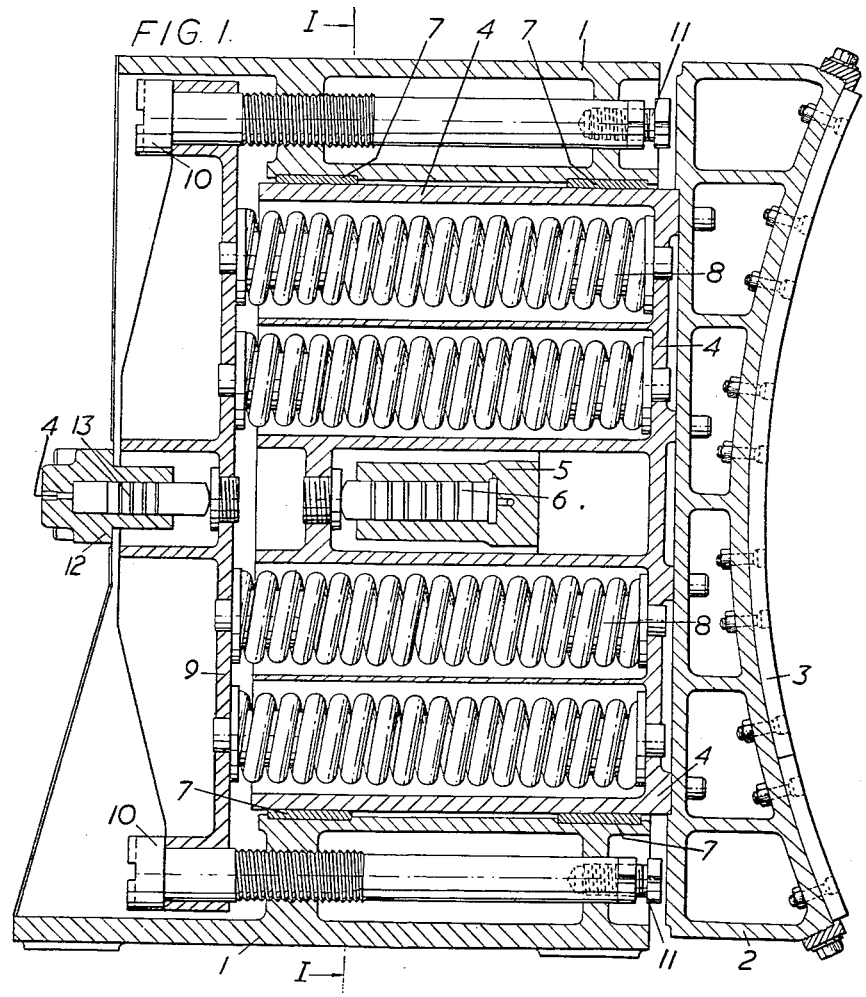
Figure 2:
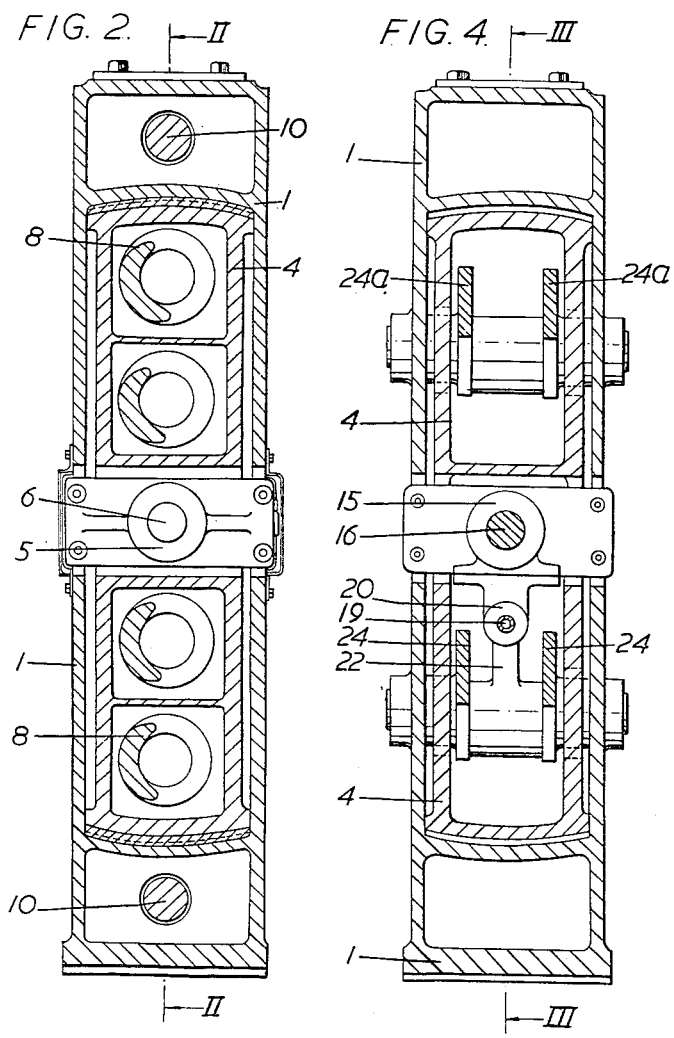
FIGURE 2 is the end elevation of the brake unit shown in FIGURE 1, sectioned along the line I—I of FIGURE 1.

Referring to FIGURES 1 and 2 each brake is in the form of a unit. Each rigid frame or housing 1 is rigidly secured in position. The arcuate brake shoe 2 is secured to a sliding element 4 guided in the rigid frame 1. An operating cylinder 5 secured to the rigid frame 1 and having a ram 6 is centrally disposed within the frame 1 and the sliding element 4. The sliding element 4 is maintained in its central position by means of circular or part circular guides 7, and at the same time the guides 7 permit the sliding element 4 to move freely in a linear direction parallel to the line joining the arcuate centre of the brake shoe 2 to the center of the winding draum (not shown). Compression springs 8 of any convenient number are interposed between the sliding element 4 and a cover 9 which is slidably secured by adjustable bolts 10 to the fixed frame 1. Adjusting screws 11 are provided to determine the amount of movement of the sliding element 4 in relation to the frame 1. A hydraulic cylinder 12 fixed to the rigid frame 1 contains an operating ram 13 which when the pressure medium is admitted at a connection 14 presses on the cover 9 to compress the springs 8.

The pressure medium is first admitted at the connection 14 and, exerting its pressure on the ram 13 and cover 9, compresses the springs 8 so that they exert the required force upon the sliding element 4, this force being determined by the reading indicated on an adjacent pressure gauge. The adjustable bolts 10 are then set to restrain the springs 8 in this position. The pressure can then be relieved from the ram 13. The adjusting screws 11 are positioned so that the sliding element 4 is stopped in its movement in their direction as required; this being the means which determines the maximum movement of the brake shoe 2 and the "on" to the "off" position.

After frequent operation of the brakes the linings 3 wear thinner and in view of the desirability of ensuring that the movement of the brake is limited by the adjusting screws 11, a ready means of adjustment to compensate for wear is desirable. This is effected by setting the adjusting screws 11 and then admitting the pressure to the ram 13 until the adjacent pressure gauge indicates that the springs 8 are again compressed to exert the required force upon the sliding element 4. The adjustment of the bolts 10 is repeated to restrain the springs 8.

When the operating fluid is admitted into cylinder 5, the ram 6, by its contact with the sliding element 4 carrying the brake shoe 2, compresses the springs 8 a sufficient and controlled distance to give the required minimum clearance between the brake lining 3 and the braking surface of the machine. When the operating cylinder 5 and ram 6 are free from the operating pressure medium, the sliding element 4 under the action of the compression springs 8 thrusts the brake shoe 2 with its lining 3 into contact with the brake surface of the rotatable machine.

A means is provided for guiding the sliding element 4 along its approved linear path and restraining it in position against any drag acting upon it when the brake is actuated. The top and bottom external faces of the sliding element 4 are of arcuate or semi-cylindrical shape as shown in FIGURE 2. The rigid frame or housing 1 has top and bottom internal faces arcuate or semi-cylindrical in shape to conform with the top and bottom faces of the sliding element 4 thereby locating and guiding the sliding element 4 when it is actuated to apply the brake or remove it.

The brakes may be so constructed that the brake-shoe 2 with the lining 3 is rapidly removable to facilitate renewal thereof and to permit renewal or repositioning of the ropes.

The principle of the positive power brake described in United States Letters Patents No. 2,490,941 and No. 2,554,235 can be adapted for the operation of brake units according to the invention, as will now be described.

Figure 3:
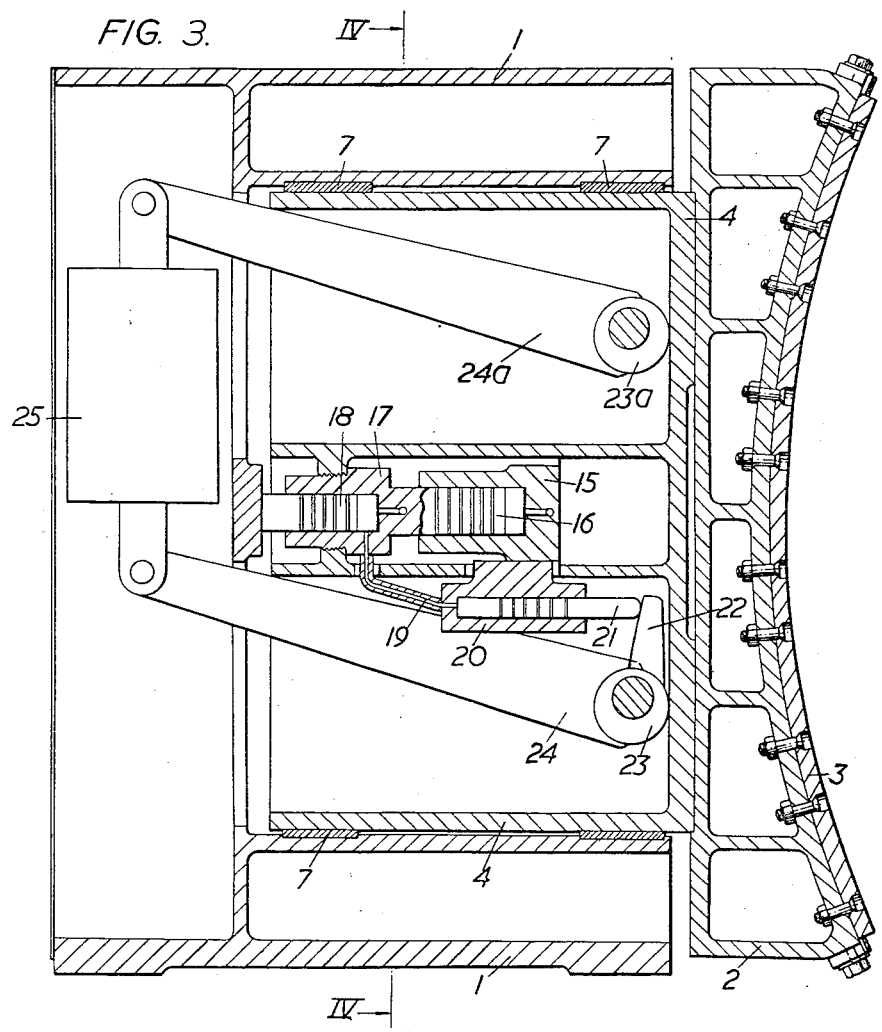
FIGURE 3 is the side elevation of another form of brake unit according to the invention, sectioned along the line III—III of FIGURE 4.

Referring to FIGURES 3 and 4, each of the unit brakes is adapted as shown therein. Each brake has a cylinder 15 secured to the rigid frame or housing 1. The ram 16 is secured to the sliding element 4 and is extended to form a cylinder 17 in which operates another ram 18 which is secured to the rigid frame 1. Whenever the operating pressure medium is available it is admitted to the cylinder 17 to exert a pressure on the ram 18. The constant pressure thus exerted is sufficient to apply the necessary braking force, as this pressure is also exerted on the sliding member 4 in the direction of the "on" position of the brake.

This constant pressure supply is also connected through a pipe 19 to a cylinder 20 and by exerting its force on a moving ram 21 retains it in an extended position. A lever 22 rockably mounted on the rigid frame 1 is thereby held in position and is connected via an eccentric 23 and a lever 24 to an emergency or pressure failure weight 25, which is supported by the ram 21 while the constant pressure supply is available, the eccentric 23 contacting with the sliding element 4. The weight 25 operating through the suitably proportioned lever 24 and the eccentric 23 is sufficient to apply the required braking force in the event of a failure of the constant pressure supply in the direction of the "on" position of the brakes. A similar eccentric 23a and lever 24a are connected to the upper part of the weight 25.

In normal operation, with the constant pressure available, the operating medium is admitted to the cylinder 15 and as the area of the ram 16 is sufficient to overcome the pressure in the cylinder 17 the brakes are moved to the "off" position by the opening of a control valve. Conversely as the control is operated to permit the medium to exhaust from cylinder 15, the brakes are applied under the constant pressure of the ram 18.

Figure 6:
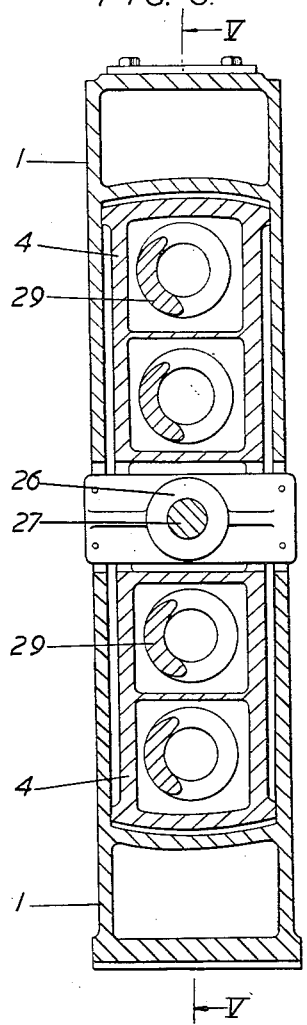
FIGURE 6 is the end elevation of the brake unit shown in FIGURE 5, sectioned along the line VI—VI of FIGURE 5.

Another means of adapting the positive power principle of operating to braking units according to the invention is obtained by eliminating the method of using a falling weight to apply the brake in the event of a failure of the constant pressure supply and by using a brake unit as shown in FIGURES 5 and 6.

Referring to FIGURES 5 and 6, each unit brake has a cylinder 26 secured to the rigid frame or housing 1. The ram 27 is extended in the form of a cylinder in which another ram 28 operates. Springs 29 are held in a preloaded or pre-compressed condition between the sliding element 4 and a wall 9a of the rigid frame 1 by means of adjustable rods 30 passing through holes in the wall 9a and in the cover 9 with adjustable nuts outside the cover 9. A constant pressure supply of the operating medium, whenever available, is supplied to the cylinder to exert a pressure on the ram 28, such pressure being transmitted to the cover 9 by means of a ram 28. As the cover 9 is restrained by the rigid frame 1 the effect of this constant pressure is to exert a load in the direction of the "on" position of the brakes which is in proportion to the area of the ram 28. In normal operation the pressure medium is admitted to the cylinder 26 by any of the means described and as the area in the cylinder 26 is larger than that of the constant pressure cylinder extension 27, it will overcome this opposing pressure and move the brakes to the "off" position. Conversely when the brakes are to be applied, the pressure medium is relieved from the cylinder 26 and under the action of the constant pressure in the cylinder extension of the ram 27 the brakes are applied.

In this method of normal operation the preloading of the springs 29 is not utilised to operate the unit brake. With the failure of the pressure medium, the constant pressure is removed from the loading ram 28 and the pressure medium exhausted from the cylinder 26, and the brakes are applied under the action of the springs 29. By the release of the pressure holding ram 28 against the cover 9 the latter is freed to permit the adjustable rods 30 to move under the load of the springs 29 and by imposing their load when making contact with the sliding element 4, move the sliding element 4 and the brake-shoe 2 in the direction of the "on" position of the brake.

Any of the unit brakes described can be slidably mounted separately to suit the requirements of the rotating element.

Figure 7:
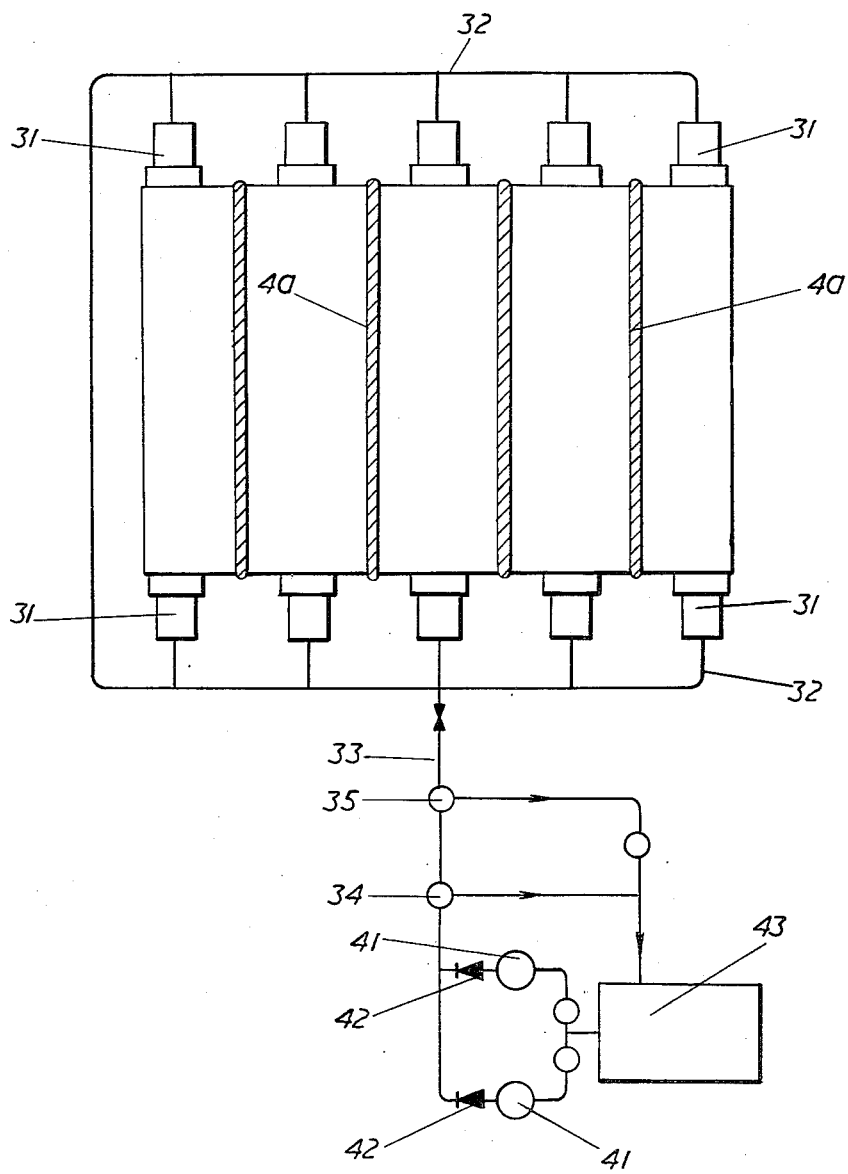
FIGURE 7 shows one arrangement of brake units according to the invention disposed along a multi-rope friction winder.

When they are used in association with multi-rope friction winders, advantage may be taken of arranging the unit brakes at intervals between the friction drive ropes 4a shown in the accompanying drawing FIGURE 7, thus keeping the length of the friction wheel to a minimum and at the same time providing a means of conveniently accommodating a greater number of units. In the application of the invention shown in FIGURE 7, all the brake operating cylinders of the unit brakes 31 are connected to the pressure medium by separate pipes 32 and then to a common pipe 33, thus bringing the control of all the unit brakes, via their operating cylinders to a common valve or valves 34. The valve 34 is of the well-known pressure controlled type and apart from the various functions of normal control it can be operated in an emergency by way of the usual methods such as by a solenoid, a magnet or a hydraulic or mechanical tripping device. As an alternative, while retaining the valve 34 a separate valve 35 can be used for emergency operations in accordance with accepted practice.

The pressure supply is conveyed from a pump or pumps 41 through non-return valves 42 to the valve 34, 43 being the pressure medium reservoir.

Figure 8:
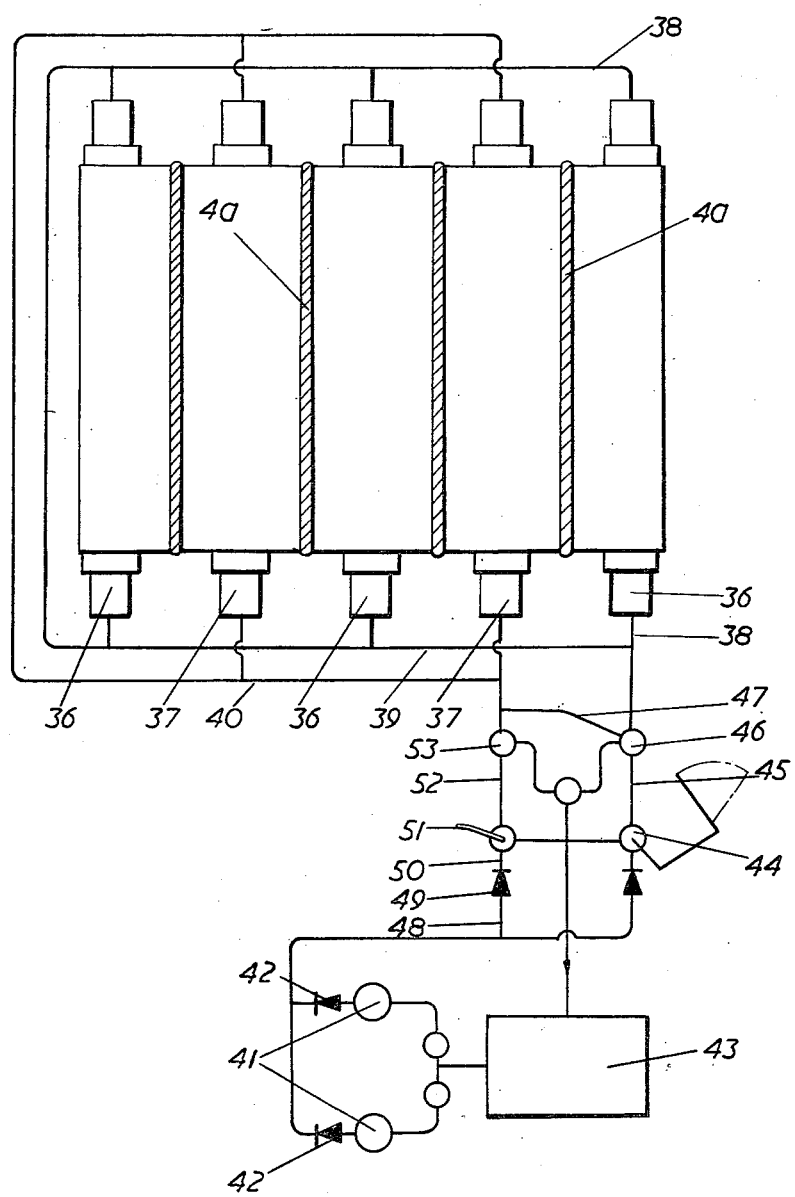
FIGURE 8 shows another arrangement of brake units according to the invention disposed along a multi-friction winder.

To meet certain requirements the cylinders of the brakes 36 and 37 shown in FIGURE 8 are connected through the pressure medium in opposing pairs by means of pipe 38. Such pairs can be singly operated or in groups by means of pipes 39 and 40 to provide a means of applying a selected portion of the total braking force available. In one such arrangement a selected number of pairs of the unit brakes, constituting the service brakes, are connected together with the pressure medium admitted from one point of control. The remaining unit brakes, constituting the emergency brakes, are connected as now to be described. The pressure supply is conveyed from the pump or pumps 41 through non-return valves 42 to the operator's control valve 44 and thence by pipes 45 and 38 to the service unit brakes 36. The supply pipe 45 is also connected to a protective valve 46, which is automatically operated to apply the service brakes if an emergency occurs within the normal travel distance of the conveyance. The valve 46 is prevented from operating, however, if the emergency brakes are already applied by pressure failure. The prevention of operation is ensured by arranging the valve 46 with a pressure interlock by means of a pipe 47 where the absence of pressure prevents the valve 46 being operated.

The cylinders of the emergency unit brakes 37 are connected from the pump or pumps 41 through a pipe 48 and through a separate non-return valve 49. The object of this non-return valve is to prevent the pressure medium escaping if there is a loss of pressure at any point previous to the entrance to the valve. From the non-return valve 49 the pressure medium is conveyed through pipe 50 to an operating valve 51 preferably of the pressure controlled type. These emergency brakes can thereby be operated at will by the operator in an emergency. From the valve 51 pipe 52 conveys the operating medium to an emergency valve 53. This can be operated by any of the known means in emergency, these being usually initiated automatically.

Such a grouping or separating of the control of the unit brakes, while providing service brakes, also provides a completely independent set of emergency brakes.

When used with a drum type winder, conveyor or similar rotating machine, the number of brake units may be restricted to four in number and these are arranged in pairs opposite and engaging with the brake paths located one at each end of the drum. These are controlled and operated in a similar manner to that described in the application for the multi-rope friction winders and as shown in FIGURE 7, where the unit cylinders are connected through the pressure medium to common pipes, thus bringing the control of the brakes through the operating cylinders to a common valve or valves. It is found with this design of brakes, on account of its particular construction and operation, the units can be restricted to four in number if preferred when on a drum type winder, haulage, etc. The common source of the pressure medium is from a pump or pumps and any of the known means of governing or controlling the exhaust of the pressure medium from the cylinders can be adopted with the invention above described.

Instead of having the arcuate brake shoes in pairs diametrically opposed to each other, three brake shoes could be employed arranged at equal distances apart around the rotatable element so that the movement of the shoes is in a radial direction with respect to the brake paths of the rotating element, each shoe being guided for linear movement and having means for simultaneously urging the brake shoes into contact with the brake drum.

What I claim as my invention is:

A brake suitable particularly for use on mine hoists and rope conveyers and consisting of a single independent unit comprising a housing for securing the brake in correct alignment with a brake tread on the machine it is required to brake, a brake shoe slidably mounted in guides secured to said housing, the respective bearing faces of the brake shoe and guides being arcuate in form so that the brake shoe may align itself correctly with the brake tread when applied, spring means by which the brake shoe is normally urged into contact with the brake tread with sufficient force exerted by the springs and controlled and governed by a ram acting in a cylinder formed integral with the housing, a pressure medium in the cylinder operating against a part of the brake shoe thereby the force of the springs is opposed to a degree infinitely variable depending on the pressure of the pressure medium, the variation of the pressure medium being controlled by a pressure control valve with means for automatic operation, means whereby the maximum force exerted by the springs on the brake shoe and thence on the brake path when not opposed by the thrust of the ram being initially set and adjusted as the wear of the brake linings occur and comprising a cover secured to the fixed frame by adjustable bolts against which the springs react and which as the bolts are screwed in or out either increases or decreases the compression of the springs to effect the adjustment, a secondary ram acting in a secondary cylinder formed integral with the housing and which is utilized to compress the springs to the desired amount with the spring adjustment bolts being set into position to retain the desired compression upon release of fluid pressure in the secondary cylinder, said bolts being capable of being screwed freely in or out to a new position, a pressure existing in the secondary cylinder when the cover is allowed to return against the heads of the adjusting bolts without imposing any force thereon, the means by which the pressure may be controlled in the secondary cylinder consisting of the opening of a valve to make a connection with the normal control circuit thus enabling the normal brake control to be used for the purpose.

References Cited in the file of this patent

UNITED STATES PATENTS

| | | |
|---|---|---|
| 586,745 | Pierce et al. | July 20, 1897 |
| 1,275,702 | Kloneck | Aug. 13, 1918 |
| 1,310,512 | Sussex | July 22, 1919 |
| 1,435,934 | Maimin | Nov. 21, 1922 |
| 2,051,968 | Saito et al. | Aug. 25, 1936 |
| 2,257,771 | Williamson | Oct. 7, 1941 |
| 2,490,941 | Bell et al. | Dec. 13, 1949 |

FOREIGN PATENTS

| | | |
|---|---|---|
| 68,261 | Austria | Mar. 26, 1915 |